(12) United States Patent
Grzybowski et al.

(10) Patent No.: US 8,496,323 B2
(45) Date of Patent: Jul. 30, 2013

(54) METASTABLE NANOPARTICLE INK COMPOSITIONS AND IMAGES MADE THEREFROM

(75) Inventors: Bartosz A. Grzybowski, Evanston, IL (US); Rafal Klajn, Rehovot (IL); Paul J. Wesson, Chicago, IL (US); Kyle J. M. Bishop, State College, PA (US)

(73) Assignee: Northwestern University, Evanston, IL (US)

( * ) Notice: Subject to any disclaimer, the term of this patent is extended or adjusted under 35 U.S.C. 154(b) by 238 days.

(21) Appl. No.: 12/775,953

(22) Filed: May 7, 2010

(65) Prior Publication Data

US 2010/0328410 A1 Dec. 30, 2010

Related U.S. Application Data

(60) Provisional application No. 61/176,746, filed on May 8, 2009.

(51) Int. Cl.
*C09D 11/00* (2006.01)

(52) U.S. Cl.
USPC ......................................................... 347/100

(58) Field of Classification Search
USPC ........................................ 347/100; 106/31.13
See application file for complete search history.

(56) References Cited

U.S. PATENT DOCUMENTS

| 6,071,675 A | * | 6/2000 | Teng | 430/302 |
| 2007/0072127 A1 | * | 3/2007 | Teng | 430/302 |
| 2009/0098366 A1 | * | 4/2009 | Smoukov et al. | 428/328 |

OTHER PUBLICATIONS

Klajn, et al, "Light-controlled self-assembly of reversible and irreversible nanoparticle suprastructures" PNAS, Jun. 19, 2007, http://222.ncbi.nlm.nih.gov/pmc/articles/PMC1965508.*

Sidhaye et al., Gold Nanoparticle Networks with Photoresponsive Interparticle Spacings, Langmuir, vol. 21, No. 17, 2005, pp. 7979-7984.

Zhou et al., Light-Induced Aggregation of Colloidal Gold Nanoparticles Capped by Thymine Derivatives, Langmuir, vol. 24, No. 9, 2008, pp. 4506-4511.

* cited by examiner

*Primary Examiner* — Laura Martin

(74) *Attorney, Agent, or Firm* — Bell & Manning, LLC

(57) ABSTRACT

Self-erasing inks in which both the printing and self-erasure of color images can be controlled by the dynamic/non-equilibrium aggregation of photoresponsive surface-coated nanoparticles contained in a carrier film are provided. The aggregation is a reversible aggregation that is triggered by a photo-induced transformation in ligands within the surface coating on the nanoparticles. Methods for forming images using the inks are also provided.

18 Claims, 8 Drawing Sheets

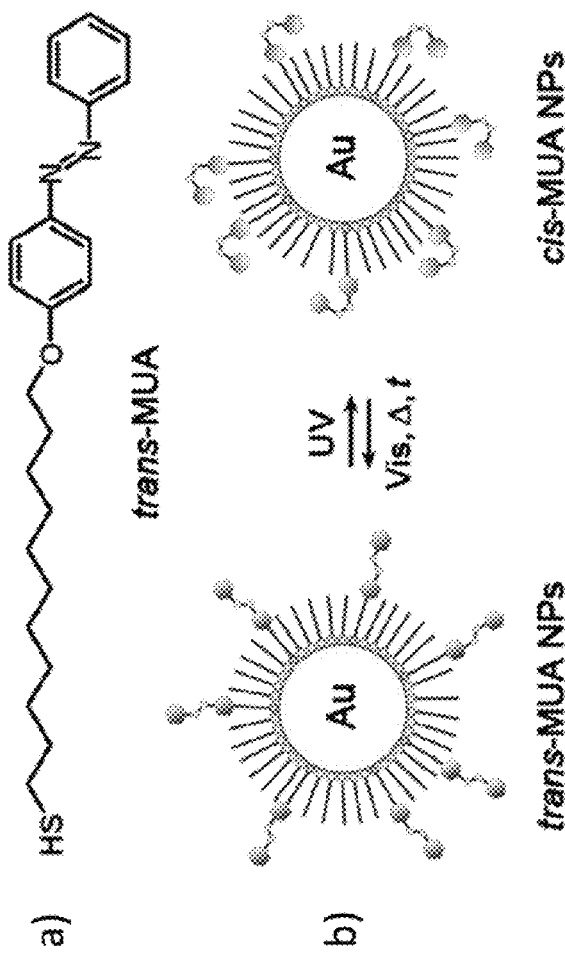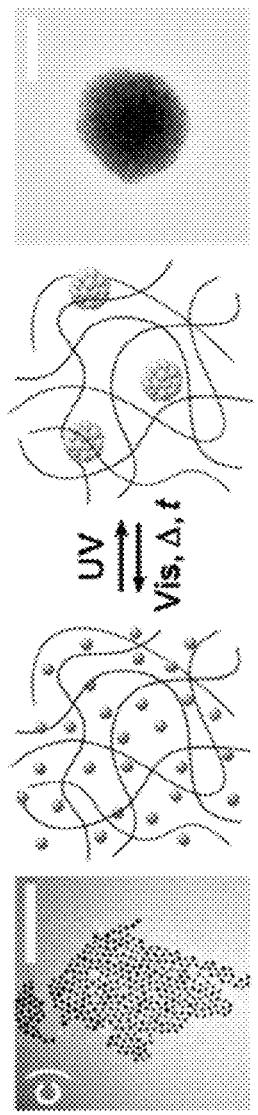
FIG. 1

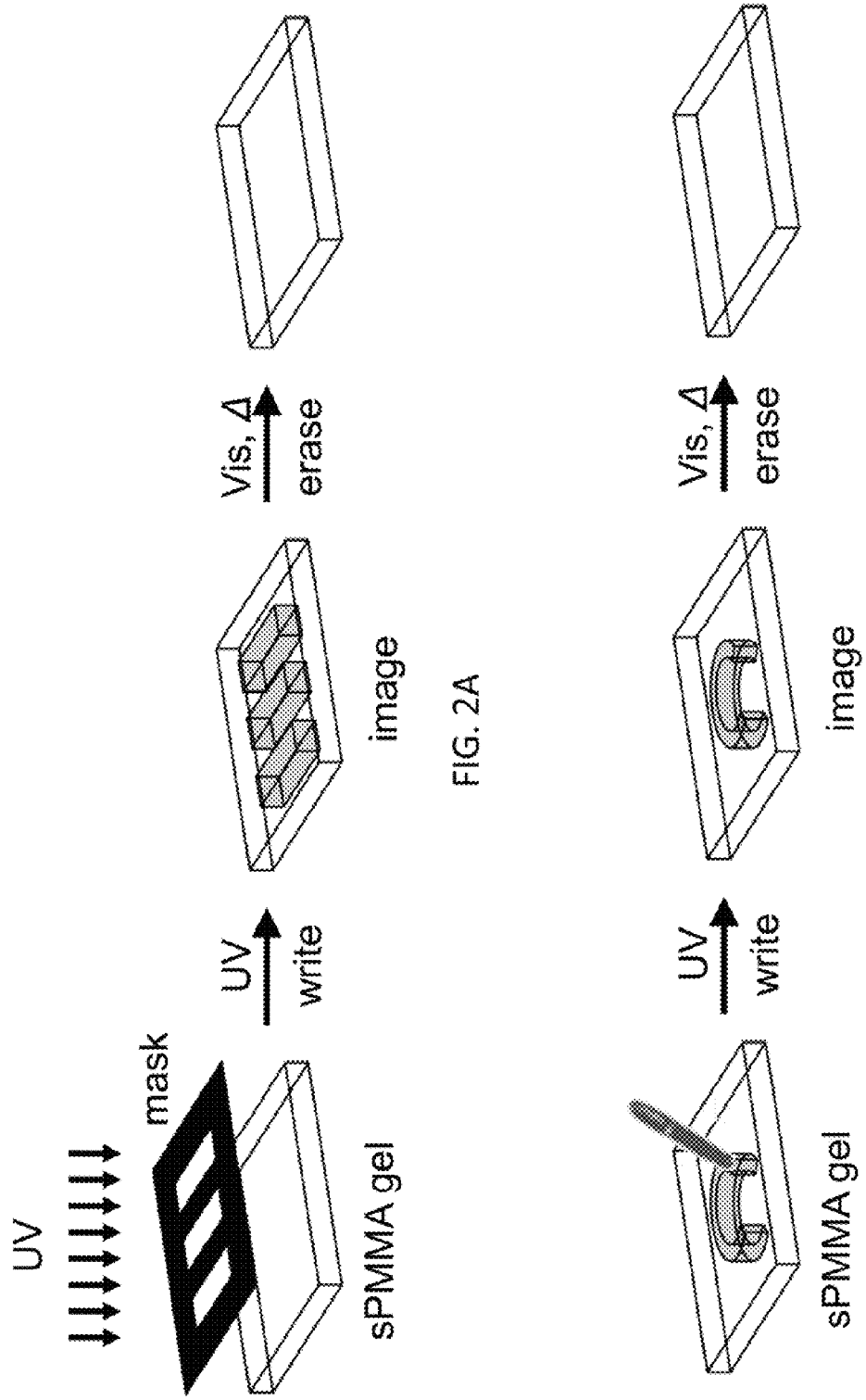

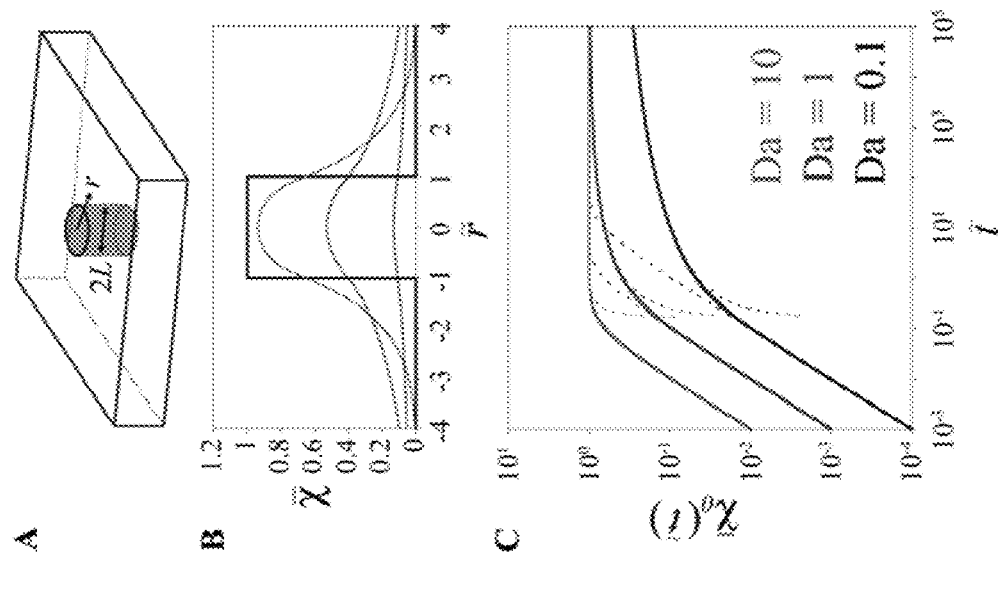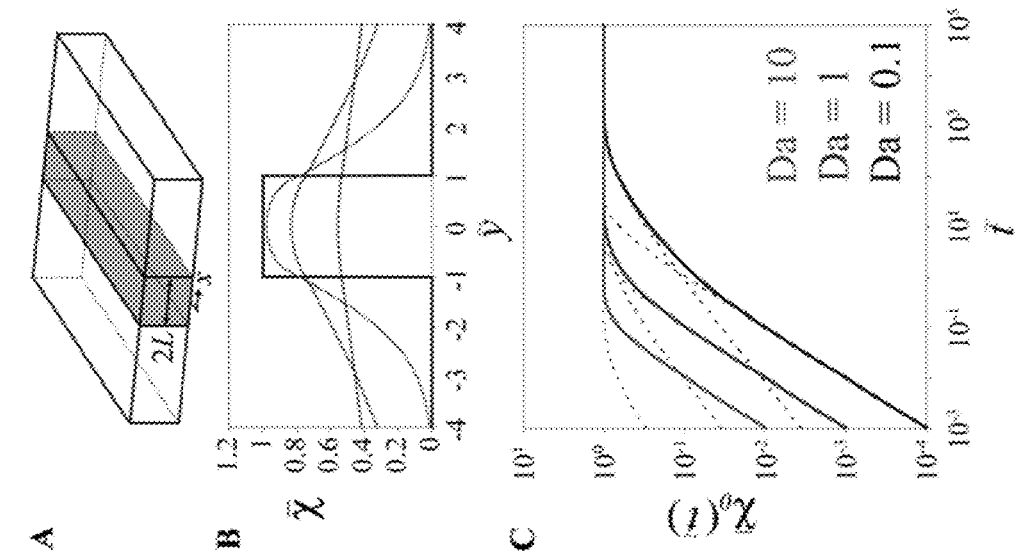
FIG. 7

METASTABLE NANOPARTICLE INK COMPOSITIONS AND IMAGES MADE THEREFROM

CROSS-REFERENCE TO RELATED APPLICATIONS

This applications claims priority from U.S. provisional patent application Ser. No. 61/176,746, filed on May 8, 2009, the entire disclosure of which is incorporated herein by reference.

STATEMENT REGARDING FEDERALLY SPONSORED RESEARCH OR DEVELOPMENT

This invention was made with government support under DMR-0520513 awarded by National Science Foundation. The government has certain rights in the invention.

BACKGROUND

This invention was made with government support under grant number DMR-0520513 awarded by the National Science Foundation. The government has certain rights in the invention.

Materials that store textual and/or graphical information for a prescribed period of time are desirable for applications in secure communications. Furthermore, if such materials are rewritable, they can help to limit the use of traditional paper, thereby reducing the costs, both industrial and environmental, associated with paper production and recycling.

Most research on self-erasing media has relied on the use of photochromic molecules—that is, molecules that isomerize and change color when exposed to light of appropriate wavelength—embedded in or attached to a polymeric/gel matrix. In one widely publicized example, Xerox Corporation has recently announced the development of photochromic paper that self-erases within 16 to 24 hours. While writing with light can be both rapid and accurate, photochromic "inks" are not necessarily optimal for transforming light-intensity patterns into color variations because they have relatively low extinction coefficients, are prone to photobleaching, and usually offer only two colors corresponding to the two states of photoisomerizing molecules.

SUMMARY

One aspect of the invention provides a self-erasing ink comprising a carrier film comprising an organogel and a plurality of metal nanoparticles, such as gold or silver nanoparticles, dispersed in the carrier film. In the inks, each metal nanoparticle has a surface coating comprising photo-responsive ligands covalently bound to the metal nanoparticle. The photo-responsive ligands are characterized in that they undergo a reversible transformation when exposed to triggering radiation, whereby the reversible transformation results in the reversible aggregation of the metal nanoparticles into non-crystalline assemblies resulting in a change in the color of the ink.

In some embodiments of the inks, the reversible transformation is a trans-cis isomerization (or a cis-trans isomerization) and the triggering radiation is UV radiation. In one such embodiment, the surface coating comprises a self-assembled monolayer and the ligands comprise azobenzene-terminated thiols, such as 4-(11-mercaptoundecanoxy)azobenzene and dodecylamine. In these embodiments, the fractional surface coverage of the azobenzene-terminated thiols in the monolayer can be, for example, about 0.2 to about 0.35.

In some embodiments, the ligands covalently bound to the metal nanoparticles are free of functional groups capable of covalently cross-linking the metal nanoparticles in the inks, thereby enabling rapid association and dissociation of the metal nanoparticles.

The nanoparticles can be present in the carrier films in high concentrations, making a variety of vibrant colors possible. For example in some embodiments of the inks, the concentration of metal nanoparticles in the carrier film in terms of metal atoms is at least 10 mM. This includes embodiments in which the concentration of metal nanoparticles in the carrier film is at least 20 mM and further includes embodiments in which the concentration of metal nanoparticles in the carrier film is at least 30 mM.

Another aspect of the invention provides methods of printing on a substrate coated with the present inks. The methods comprise irradiating the inks with triggering radiation, such as ultraviolet radiation, to form an image. In some embodiments of the methods, the triggering radiation intensity, duration or both are varied over different regions of the ink, such that a multi-colored image is formed on the substrate. When the triggering radiation is discontinued, the resulting image self-erases. The rate at which the image self-erases can be increased by exposing the image to visible light or heat.

BRIEF DESCRIPTION OF THE DRAWINGS

FIG. 2. shows: (a) a schematic diagrams of a method for creating images using an the present inks by exposing them to triggering radiation through a photomask; and (b) a schematic diagrams of a method for creating images using an the present inks using a light pen.

FIG. 7 (left) & (right) (for Example Appendix C): (A) Schematic illustration of the model geometries: isolated linear (left) and circular (right) features. (B) Average cis-MUA coverage profiles for different feature sizes, L, after irradiation for $t_{exp}$=10/$k_{tc}$ (in dimensionless quantities, $\tilde{t}_{exp}$=10$D_{NP}$/$k_{tc}L^2$=10/Da). The plots correspond to L=$\sqrt{DaD_{NP}/k_{tc}}$. In these plots Da→∞ is represented by the rectangular curves in the B panels, Da=10 is represented by the curves having the highest peak height in the B panels and by the leftmost curves in the C panels, Da=1 is represented by the curves having the second highest peak height in the B panels and by the center curves in the C panels, and Da=0.1 is represented by the curves having the lowest peak height in the B panels and by the rightmost curves in the C panels. Notice that smaller features (corresponding to smaller Da) result in smaller coverage of cis-MUA, thereby inhibiting NP aggregation. This effect is more enhanced in circular features (right) than in linear features (left) (C) Peak cis-MUA coverage, $\tilde{\chi}_0(\tilde{t})$=$\chi_{cis}(0,\tilde{t})$/$\chi$ as a function of time in linear (left) and circular (right) features for different values of the Damkohler number, Da. While these curves are identical for Da>>1 (reaction-limited regime), they differ significantly for Da<<1 (diffusion-limited regime) due to differences in the feature geometry. The dashed curves illustrate the approximate forms valid in the small and large time regimes.

DETAILED DESCRIPTION OF THE INVENTION

Figure 1D:
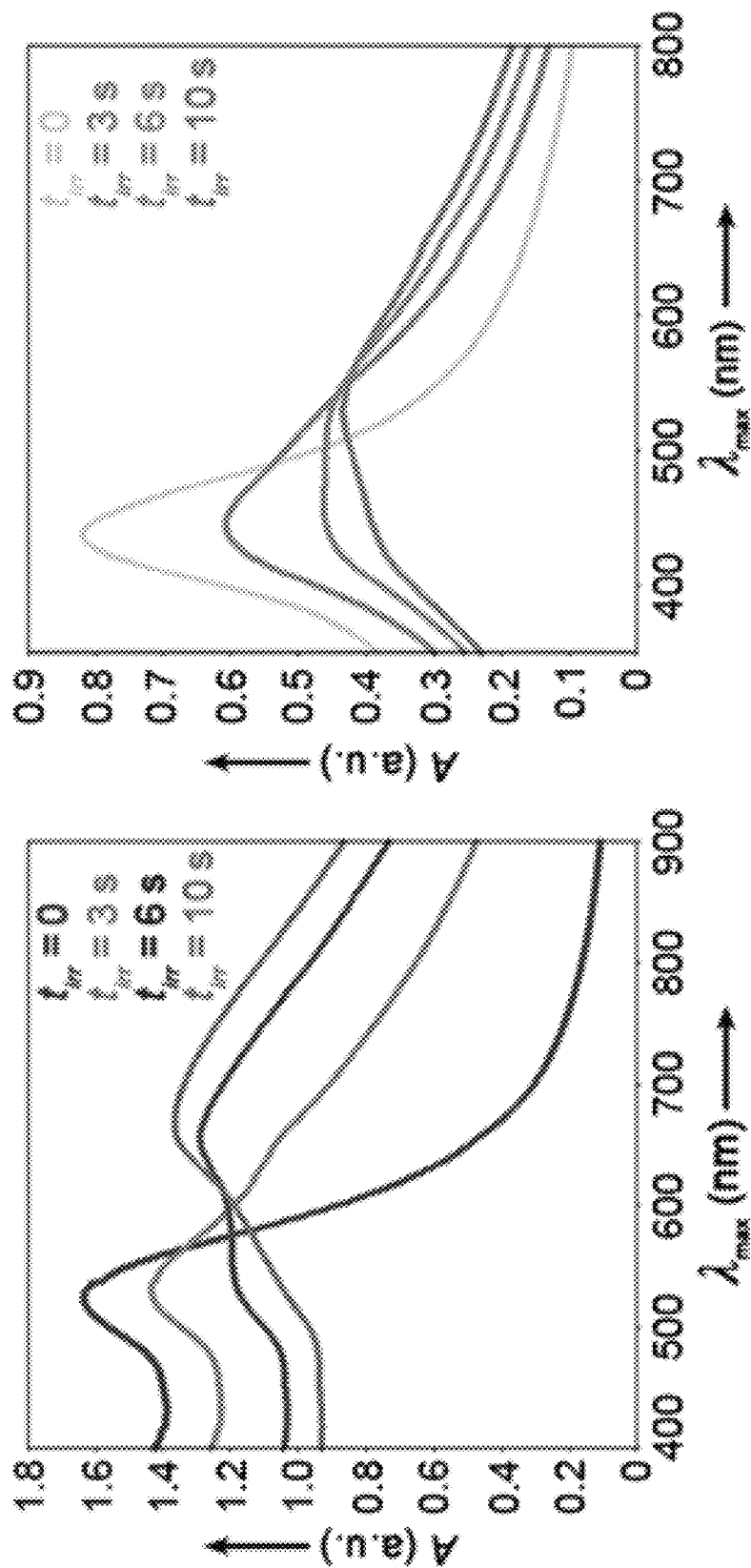
FIG. 1. shows: (a) the structural formula of trans-4-(11-mercaptoundecanoxy) azobenzene (MUA); (b) a schematic illustration of UV irradiation of nanoparticles (here, gold) covered with a mixed monolayer of MUA and dodecylamine (DDA) causing photoisomerization of trans-MUA to the cis form (the cis isomer reverts to trans form either spontaneously (slowly), or upon irradiation with visible light, or by heating (both, rapidly)); (c) a schematic illustration showing that upon UV irradiation, photoactive NPs form metastable aggregate (the grayscale renderings shown here show two of the states of gold particles—free gold nanoparticles (AuNPs) are red, aggregated nanoparticles (NPs) are blue; scale bars on the transmission electron micrograph (TEM) images=100 nm); (d) UV-Vis spectra of AuNP (left) and AgNP (right) films exposed to 365 nm UV light (10 mW/cm$^2$) for times $t_{irr}$ varying from 0 to 10 sec. In both cases, the red-shift of the surface plasmon resonance (SPR) band is due to the aggregation of particles into aggregates of mean diameter d=150 nm.
Figure 3:
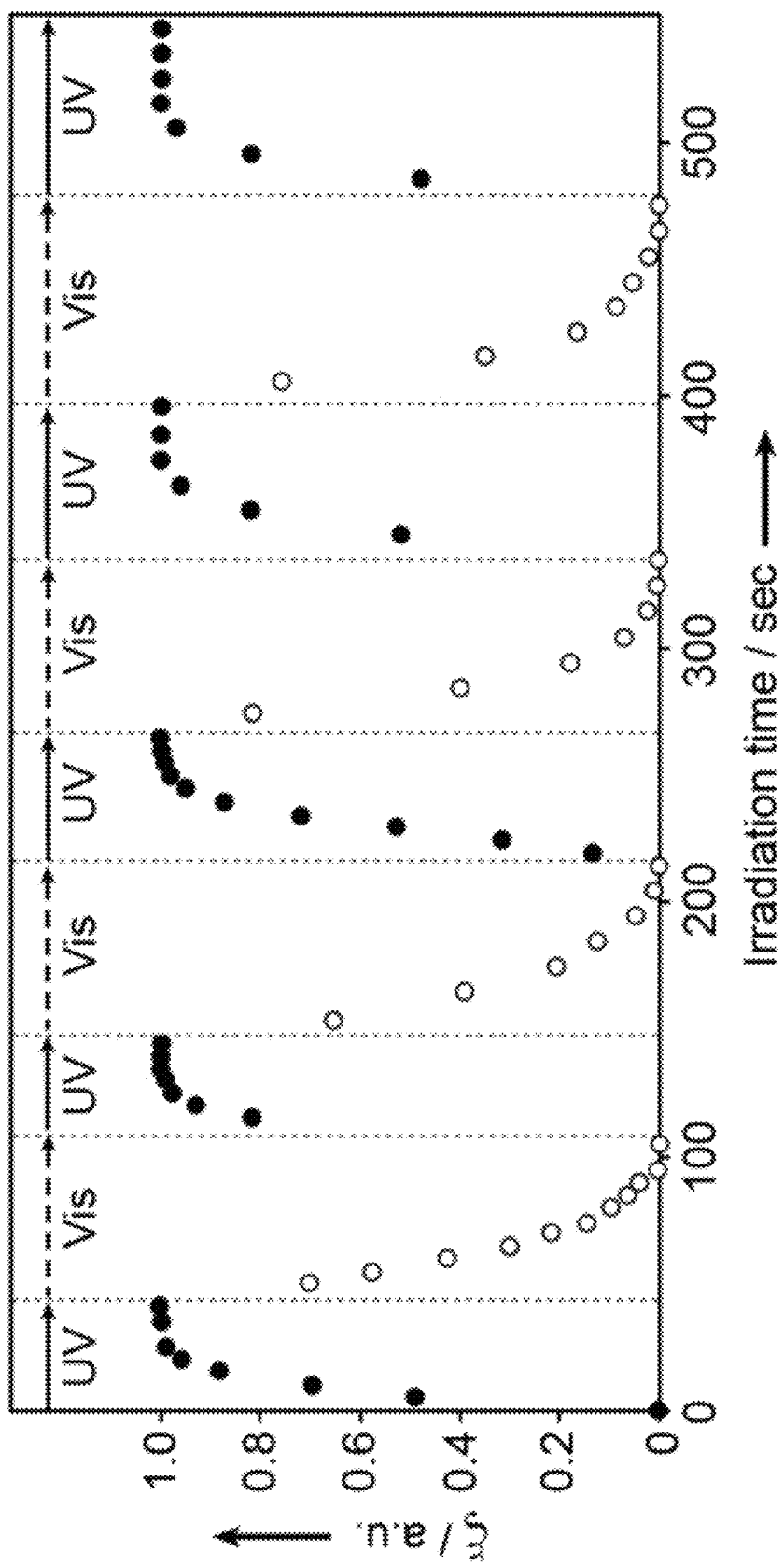
FIG. 3. shows the reversible spectral changes of an AuNP ($\chi$=0.3) film upon alternating exposures to UV (0.7 mW/cm$^2$) and visible light, as described in the Example. Here, ξ is a "progress variable" calculated from the experimental extinction spectra using the CIE 1931 standard observer functions. This variable characterizes the apparent color of the film and ranges from zero (unaggregated; red for AuNPs) to one (fully aggregated; light blue for AuNPs). The film's optical response does not change for at least 300 cycles performed.

One aspect of the present technology provides self-erasing inks in which both the printing and self-erasure of color images can be controlled by the dynamic/non-equilibrium aggregation of photoresponsive surface-coated nanoparticles contained in a carrier film. The aggregation is a reversible aggregation that is triggered by a photo-induced transformation in ligands within the surface coating on the nanoparticles. The inks can be coated onto a substrate, such as paper, and an image can be formed on the substrate by exposing it to appropriate radiation to trigger the reversible color-changing transformation. As such, the inks can be used to store information with multiple read/write cycles.

The present inks and printed substrates have many applications including, but not limited to, temporary information storage and as labels that change in response to light exposure. Examples of specific applications include, temporary storage of confidential/sensitive information, reusable information storage media (e.g. newspapers, displays), self-expiring passes (e.g. bus tickets), labels for light-sensitive products, including food or beverages, and means of measuring doses of visible (including sunlight) or UV light.

In one embodiment, a self-erasing ink comprises a carrier film and a plurality of nanoparticles dispersed in the carrier film. The nanoparticles have a surface coating that includes photo-responsive ligands that undergo a reversible transformation when exposed to triggering radiation. This transformation results in the reversible aggregation of the nanoparticles into non-crystalline assemblies and results in a change in the color of the ink.

The carrier film may be a water-based film or an organic-based film. If the carrier film is water-based, the nanoparticles are desirably hydrophilic nanoparticles. In some embodiments, the carrier film comprises an organogel, such as a syndiotactic poly(methyl methacrylate) organogel. As used herein, the term organogel refers to a gel in which the liquid phase within the matrix is an organic liquid, rather than water. In these embodiments, the photo-induced assembly and disassembly of nanoparticles within thin gel films depends on and is controlled by surface modification of the nanoparticles. For this invention, the photoresponsive molecules in the surface coating undergo a transformation to a lower solubility form in the gel's solvent upon exposure to radiation. This change in solubility then induces assembly or disassembly of the nanoparticles, resulting in a change in the nanoparticles' absorption spectrum. The use of an organogel can improve the resolution of images formed with the present inks because the presence of the gel causes the diffusivity of the nanoparticle aggregates to be much smaller than in solution. As a result, the rate at which aggregates formed in the regions exposed to triggering radiation is reduced, such that a sharper contrast in maintained in the image. In some embodiments, images made according to the present methods have a resolution of 20 μm or better. This includes images having a resolution of 10 μm.

The nanoparticles can have diameters of, for example, 20 nm or less (e.g. 10 nm, 8 nm or 6 nm or less) and can be made of a variety of materials. However, for ink applications, the nanoparticles are desirably monodisperse or substantially monodisperse and have diameters of no greater than about 6 nm. Metal nanoparticles, particularly non-toxic metal nanoparticles, are well-suited for use in the present inks. Metal nanoparticles include, but are not limited to, gold nanoparticles, silver nanoparticles, nanoparticles comprising alloys of gold and silver, and mixtures thereof. The concentration of nanoparticles in the carrier film can be quite high. In some embodiments, the concentration of nanoparticles in terms of metal atoms in the carrier film is at least 10 mM. This includes embodiments where the concentration of nanoparticles in the carrier film is at least about 20 mM, and further includes embodiments where the concentration of nanoparticles in the carrier film is at least about 30 mM.

The nanoparticles are functionalized with surface coatings that include a photo transformable ligand. The transformation of the photoresponsive ligands in the nanoparticle coatings that causes the nanoparticles to aggregate upon exposure to triggering radiation may be any photo-induced, reversible transformation. In one embodiment, the transformation is a trans-cis (or cis-trans) isomerization. The wavelength range of the triggering radiation will depend on the particular transformation being induced. However, in some embodiments the triggering radiation is ultraviolet (UV) radiation, which causes nanoparticle aggregation, which causes a red shift in the absorption spectrum of the film.

By modulating the surface coverage of the photoresponsive ligands, one can control the kinetics and reversibility of the process. The fractional surface coverage of the photoresponsive ligands in a mixed monolayer should be sufficiently high to allow intermolecular forces between the molecules (e.g., dipole-dipole forces) to induce aggregation of the nanoparticle upon exposure to triggering radiation, but not so high as to result in irreversible aggregation. Thus, in some embodiments of the present inks, the nanoparticles have a fractional surface coverage ($\chi$) of covalently bound photoresponsive ligands of about 0.2 to 0.4. This includes embodiments in which the nanoparticles have a surface coverage of covalently bound photoresponsive ligands of about 0.2 to 0.35.

The reversible nanoparticle aggregation is desirably due solely to dipole-dipole interations. As such, the surface coatings are desirably free of ligands or other molecules that are capable of forming covalent crosslinks between nanoparticles in the inks. Such crosslinks would interfere with the rate and the reversible nature of the nanoparticle aggregation. In addition, the surface coatings are desirably free of surfactants, such as didodecyldimethylammonium bromide (DDAB).

Examples of ligands that can undergo a photo-induced trans-cis isomerization include, but are not limited to, azobenzene derivatives, such as azobenzene-terminated thiols. These azobenzene-terminated thiols may form a mixed self-assembled monolayer (SAM) on the surfaces of the nanoparticles in the inks. One such SAM comprises 4-(11-mercaptoundecanoxy)azobenzene (MUA). This molecule contains a phototransformable azobenzene group that can exist in two configurations—a hydrophobic trans form, which is the ground state of the molecule, as well as a metastable hydrophilic cis form. In one specific embodiment of the inks, coated nanoparticles are dissolved in a physical gel (syndiotactic poly(methyl methacrylate)) with toluene as a solvent. Because the nanoparticles are suspended in a hydrophobic gel medium, they remain well dissolved when the azobenzene groups are in the ground state, and the sample has a color characteristic for individual nanoparticles (i.e., red for gold, yellow for silver nanoparticles). Upon irradiation with UV light, however, the trans-azobenzenes isomerize to their cis form and, due to the increased dipole moment of the cis-azobenzene relative to the trans-azobenzene, the nanoparticles become significantly more hydrophilic. The cis-azobenzene-coated nanoparticles then attract one another and form large spherical clusters, which minimize the number of cis-azobenzene groups in contact with toluene. One specific embodiment of the invention takes advantage of the facts that i) the color of the aggregated nanoparticles is determined by the size of the assembly and is significantly different than that of the individual nanoparticles, and ii) the azobenzene isomerization, as well as the nanoparticle assembly process, is fully reversible, allowing the samples to revert back to their original color by irradiation with visible light, heating (both within minutes), or by storing in the darkness (within days).

The present inks can be used to form self-erasing images on a variety of substrates, including paper. For example a basic method of printing on a substrate coated with the inks described herein, includes the step of irradiating the ink-coated substrate with triggering radiation to form an image. In the present methods, the intensity, duration or both, of the triggering radiation can be varied over different regions of the substrate to form a multi-colored image on the substrate. The images can be formed, for example, by irradiating the substrate through one or more masks, or by using a spatial light modulator. Multi-colored images include images having two different colors, three different colors, or more. In some embodiments, the images will include colors across the visible spectrum from red to violet. The time required to form an image will depend on a variety of factors, including the desired colors in the image, the wavelengths and intensity of the triggering radiation, and the nature of the surface coating on the nanoparticles. By way of illustration, in some embodiments the triggering radiation is ultraviolet radiation having an intensity of 0.7 mW/cm$^2$ or greater, which can be used to form an image in the inks by irradiating the inks for 1 minute or less. This includes embodiments wherein the image is formed during an irradiation period of 10 seconds or less, 5 seconds or less, 2 seconds or less, or even 1 second or less.

In the multi-colored images, the color of the ink depends on the degree of assembly of the nanoparticle contained therein. For example, individual gold nanoparticles exhibit a red color, and assembly causes the color to change continuously from red to purple to blue to gray-blue as the aggregate size increases. Likewise, a sample of individual silver nanoparticles is yellow, but aggregated silver nanoparticles are orange, red, and then purple, again depending on the degree of aggregation.

Once the image has been formed on a substrate the irradiation can be discontinued and the image can be allowed to self-erase. The time required to self-erase can vary over a broad range and depends on variety of factors including the wavelengths and intensity of the radiation to which the image is exposed as it fades and the nature of the surface coating on the nanoparticles. In some embodiments, the time for erasure can be shorted by exposing the images to visible light and/or heating. Thus, in some embodiments the time required for an image to self-erase is at least 1 hour in ambient daylight (10 nW/cm$^2$). This includes embodiments where the time required for the image to self-erase is at least one day. However, the speed of the self-erasing process can be substantially increased by exposing the image to visible light, heat, or both. In some instances, this can reduce the time require for an image to self-erase to less than one minute. For example, in some embodiments images can be erases in a period of 60 seconds or less by exposing them to visible radiation with an intensity of 0.3 mW/cm$^2$ or higher. This includes embodiments in which an image can be erased in 10 seconds or less, or even in 1 second or less. For the purposes of this disclosure, an image, or a portion of an image, is considered to be erased if it has reverted back to the initial color of the ink, as defined by the unaggregated nanoparticles contained therein.

The present invention is illustrated by the following, non-limiting example.

Example

This example illustrates a self-erasing ink in which both the "writing" and self-erasure of color images are controlled by the dynamic/non-equilibrium aggregation of photoresponsive gold and silver nanoparticles embedded in thin, flexible organogel films. More specifically, this example is based on AuNP (5.6±0.6 nm) or AgNP (5.3±0.3 nm) "inks" coated with mixed self-assembled monolayers (mSAMs) of dodecylamine (DDA) and a photoswitchahle azobenzene-terminated thiol 4-(11-mercaptoundecanoxy)azobenzene, MUA. The structure of MUA is shown in FIG. 1A.

Synthesis:

Synthesis of 4-(11-mercaptoundecanoxy)azobenzene (MUA):

Synthesis of 4-(undec-10-enyloxy)azobenzene 4-(phenyldiazenyl)phenol (2.100 g; 10.60 mmol) and potassium tert-butoxide (1.247 g; 11.13 mmol) were placed in a dry, two-neck, round-bottom flask equipped with a magnetic stirring bar, a reflux condenser, and a rubber septum. The flask was evacuated and purged with dry argon, then 25 mL of anhydrous N,N-dimethylformamide was added while stirring. As soon as the solids disappeared, 11-bromo-1-undecene (2.44 mL; 2.595 g; 11.13 mmol) was added and the solution was quickly heated, and allowed to reflux for 10 min. Formation of white precipitate was observed, and the color of the solution changed from deep red to bright orange. After 10 min, the heating was discontinued, and the flask was allowed to cool down. The reaction mixture was poured into a separatory funnel containing 100 mL of water, and extracted with four 50 mL portions of hexane. Hexane fractions were combined and dried over magnesium sulfate. Hexane was removed on a rotary evaporator, and the residue was purified by column chromatography (ethyl acetate:hexane 1:20) to give 2.95 g (79.5%) of analytically pure product.

Synthesis of 4-(11-thioacetoxyundecanoxy)azobenzene 4-(undec-10-enyloxy)azobenzene (1.0 g; 2.86 mmol) and azobisisobutyronitrile (141 mg; 0.86 mmol) were placed in a dry, two-neck round-bottom flask equipped with a magnetic stirring bar, a reflux condenser, and a rubber septum. The flask was evacuated and purged with dry argon, then 20 mL of degassed toluene was added while stirring. 806 µL (871 mg; 11.44 mmol) of thioacetic acid was added, and the solution was heated and allowed to reflux. The course of the reaction was monitored by thin layer chromatography (TLC) (silica gel, ethyl acetate-hexane 1:9). After 1 hour, the conversion of starting material was complete, and the flask was allowed to cool down at room temperature. The solution was poured into a separatory funnel containing 100 mL of saturated sodium hydrocabonate solution in water, and 50 mL toluene. The organic phase was separated, extracted with four 50 mL portions of deionized water, and dried over $MgSO_4$. Residue that was obtained after removing the solvent on a rotary evaporator was purified by column chromatography (ethyl acetate:hexane 1:15) to give 954 mg (78%) of the desired thioacetate product.

Synthesis of 4-(11-mercaptoundecanoxy)azobenzene (MUA)

4-(11-thioacetoxyundecanoxy)azobenzene (954 mg) was placed in a round-bottom flask equipped with a reflux condenser. The flask was purged with argon, and 20 mL of degassed methanol, and 5 mL of 1M solution of HCl in methanol was introduced. The solution was heated and allowed to reflux. The course of the reaction was monitored by TLC (silica gel, ethyl acetate-hexane 1:9). After 6 hours, the conversion of starting material was complete. The solvent was removed on a rotary evaporator. Yellow crystalline product was dried overnight under vacuum. Yield was 856 mg (quantitative), and no purification was required.

Preparation and Functionalization of Gold and Silver Nanoparticles:

Synthesis of Monodisperse, 5 nm Gold Nanoparticles

Au NPs were synthesized by a seeded growth method, as described in Jana, et al., *J. Chem. Soc.* 2003, 47, 14280-14281. Specifically, DDAB stock solution was first prepared by dissolving 925 mg DDAB in 20 mL toluene. 50 mg of $HAuCl_4.3H_2O$ and 450 mg DDA were added to 12.5 mL of the stock solution and sonicated until dissolved. Gold (III) was then reduced by dropwise addition of 125 mg TBAB in 5 mL of the DDAB stock solution under vigorous stirring. Thus prepared seed (4 nm NPs) solution was aged for 24 hours. The growth solution was prepared by adding 7 mL of the aged seed solution to 50 mL of toluene containing 200 mg $HAuCl_4.3H_2O$, 1.00 g DDAB and 1.85 g DDA. Finally, 131 µL hydrazine dissolved in 20 mL of the stock solution was added dropwise to the growth solution under vigorous stirring. Thus prepared Au NPs had diameters 5.6±0.6 nm.

Synthesis of Monodisperse, 5 nm Silver Nanoparlicles

Ag NPs were prepared by a direct reduction of a silver salt with hydrazine as a reducing agent. Specifically, 9.6 µL hydrazine was sonicated in a solution of 516 mg decanoic acid (DA) in 30 mL toluene until dissolved, followed by the addition of 300 µL TBAB solution in toluene (9.7 mM). In a separate vial, 51 mg AgOAc and 111 mg DDA were added to 5 mL toluene and the solution was sonicated until dissolved. Thus prepared $Ag^+$ solution was then added dropwise to the hydrazine solution under vigorous stirring to yield a yellow solution of Ag NPs (5.3±0.3 nm).

Functionalization of Gold and Silver Nanoparticles

As-prepared gold or silver nanoparticles in toluene were precipitated by the addition of methanol (1:1 v/v). Au NPs settled down after ~2 hrs, Ag NPs were stored overnight in the refrigerator. Black solids were washed extensively with methanol to remove excess surfactant, and then redispersed in the half of the original volume of toluene. To as-prepared surfactant-free solution of Au and Ag NPs, appropriate amount of a toluene solution of 4-(11-mercaptoundecanoxy) azobenzene (MUA) (c=4.0 mM) was injected. Here, it is assumed that in the absence of any additional amount of the surfactant in the solution, the thiols added have quantitatively displaced the weakly-bound ligands (DDA and DA) from the NP surfaces due to the much (by approximately two orders of magnitude) stronger binding of the thiols to the metal NP surfaces.

For example, to obtain a batch of MUA/DDA-AuNPs at $\chi=0.23$, 70 µL of the 4.0 mM MUA solution (corresponding to $2.8 \cdot 10^{-7}$ mol of MUA) was added to 1.0 mL of the purified DDA-AuNPs solution (which corresponds to $1.22 \cdot 10^{-6}$ mol of ligand binding sites (calculated using average diameter of gold NPs, $d_{AuNP}$=5.6 nm; density of gold, $\rho_{Au}$=19.3 g·cm$^{-3}$; atomic mass of gold, $M_{w,Au}$=197 g·mol$^{-1}$, and a surface area occupied by a single thiolate ligand, $S_{RSH}$=0:214 nm$^2$).

Within 30 min, the MUA-modified NPs can be used for light-induced self-assembly experiments.

Synthesis of Syndiotactic poly(methylmethacrylate) (sPMMA):

sPMMA was prepared via stereocontrolled Ziegler-Natta cationic polymerization of methyl methacrylate (MMA). Initially, MMA was purified from a stabilizer (MEHQ) by vigorous shaking with a 5% aqueous NaOH solution, followed by washing with water, drying over magnesium sulfate and distillation under reduced pressure. Freshly distilled MMA (8 mL) in 40 mL anhydrous toluene was then added at −78° C. in one portion to the catalyst solution prepared by stirring AlEt$_3$ (triethylaluminum; 3.228 g), Ti(OPr$^i$)$_4$ (titanium triisopropoxide; 856 µL) and anhydrous toluene (40 mL) at 90° C. under argon for 1 hr. Stirring was continued for 12 hrs at −78° C. under argon atmosphere. The reaction was then quenched by the addition of 40 mL of methanol saturated with HCl. The white precipitate was collected, washed four times with methanol and dried. Yield: 4.897 g (64.9%). Syndiotacticity=90.3%. Syndiotacticity was estimated by integration of the two C-methyl group peaks in the $^1$H NMR spectrum of poly(methyl methacrylate) at δ=0.87 ppm and δ=1.03 ppm, as described in F. A. Bovey, *NMR of Polymers*, Academic Press, San Diego, 1996.

Preparation Self-Erasing Paper:

Preparation of the self-erasing paper: Toluene (375 µL) with syndiotactic PMMA (20.0 mg) was heated at T=80° C. until the polymer dissolved to form a clear solution. At the same temperature, photoswitchable gold or silver NPs in toluene (375 µL) were added and stirring was continued until a homogeneous solution was obtained. This solution was then injected between two preheated sheets of a flexible polymer (poly(vinyl chloride) coated polyethylene terephthalate); Fleischer et al., *MRS Bull.* 1996, 21, 14-19; 150 µm thick) separated by four thin stripes made the same material and allowed to cool down to room temperature.

Results:

When exposed to UV light, the trans-azobenzene groups coating the NPs isomerize to cis-azobenzenes having large dipole moments. This is shown schematically in FIG. 1b. As a result, the NPs aggregate into supraspherical (SS) assemblies, as shown in FIG. 1c, whose apparent color depends on the time of UV-irradiation. Since the SS are metastable and fall apart spontaneously in the absence of UV irradiation, the two-color and multicolor images written into the films gradually self-erase once the triggering UV radiation is removed. The erasure times can be controlled by the number of dipoles induced on the nanoparticles and can also be accelerated by the exposure to visible light or by heating the material. Multiple images can be written into the same film either concurrently or sequentially after the erasure of each previous image. In a wider context, the present system demonstrates the ability of nonequilibrium nanostructures to create "smart" materials capable of changing their properties and/or function "on demand" in response to external stimuli.

The present system offers three important advantages over the previously studied photoactive NPs coated with azobenzene dithiols (ADT), which crosslinks between the nanoparticles, and stabilized in solution by large excess of didodecyldimethylammonium bromide (DDAB) surfactant. First, the absence of the second terminal mercapto group present ligands enables full reversibility of aggregation (i.e., no covalent crosslinking takes place between nanoparticles) for at least several hundreds of cycles (vs. <20 in the ADT/DDAB system). Second, although in the absence of dithiol crosslinking, the NPs cannot self-assemble into well-ordered crystals, they aggregate and disaggregate (into similarly sized but orderless structures) much more rapidly (~1 sec vs. ~10 min). Third, the surfactant-free NPs are stable in gel matrices. This stability extends to high NP concentrations (>30 mM vs. <1 mM previously in solution) and gives deep colors even to thin gel films. Together, these properties enable dispersion of the NP "inks" in the gel "photopaper" and allow for rapid, high-contrast "writing" using light.

Despite relatively low concentrations of the NPs in the self-erasing paper, but owing to their high extinction cross-sections ($4.2 \cdot 10^{-18}$ m$^2$ for gold and $1.2 \cdot 10^{-17}$ m$^2$ for silver), the films were colored brightly: red for AuNPs and yellow for AgNPs. Importantly, in the absence of UV irradiation, the NPs in the gel had UV-Vis spectra nearly identical to those of free NPs in toluene ($\lambda_{max,Au}$~525 nm, $\lambda_{max,Ag}$~420 nm), indicating that the particles were unaggregated. When, however, the films were exposed to UV light, they changed color in the irradiated regions, and the degree of this change depended on the time of UV irradiation, as illustrated in FIG. 1d. In the absence of the triggering UV irradiation, the images written into the films gradually self-erased, with the erasure times controlled by the composition of the mSAMs coating the NP "inks".

The changes observed upon UV irradiation (365 nm, $I_{UV}$=0.7-10 mW/cm$^2$) were due to the rapid trans-to-cis isomerization of the azobenzene groups of MUA. This isomerization caused a significant increase of the dipole moment (µ=~5 debye for the cis form vs. ~1 debye for the trans isomer), which mediated attractive interactions between the NPs. The strength of these interactions depended on the surface concentrations of the MUA tethered onto the NPs. For low concentrations, χ<0.23, the dipole-dipole forces between NPs were too weak to cause aggregation; for χ>0.34, irreversible aggregation occurred even in the absence of irradiation. For 0.23<χ<0.34, the NPs aggregated reversibly into disordered, metastable aggregates (~150 nm in diameter by TEM), which disintegrated in the absence of UV light (FIG. 1c). This reversible NPs aggregation was the basis of rewritable and self-erasing materials.

Formation of the metastable aggregates in the UV-exposed regions of the paper manifested itself by the broadening and red-shifting of the NPs' SPR band and by concomitant color changes. The degree of these changes reflected the proportion of the aggregated NPs (as explained in greater detail in Example Appendix A) and depended on the nature of the NPs in the film and on the irradiation dose: AuNP "inks" evolved gradually from red to pale blue (FIG. 1d, left) and AgNP ones from yellow to violet (FIG. 1d, right). Two-color images were created in AuNP and AgNP films by photomask exposure to $I_{UV}$=10 mW/cm$^2$ for ~0.8 sec. In one, violet text was written into the film using a UV pen ($I_{UV}$=10 mW/cm$^2$) scanned above the surface at ~3 mm/s, as shown schematically in FIG. 2b. Remarkably, multicolor images could be created with one nanoparticle "ink" by varying the irradiation dose over different regions of the film. For example, images of flowers and the Union Jack shown were created in AuNP films by irradiating ($I_{UV}$=10 mW/cm$^2$) for 0.8 sec to create purple regions, and for 10 sec to create pale-blue regions. A multicolor AgNP film, where two images were written consecutively, one of them onto a bent film giving the overall illusion of curvature, was also created.

Due to the reversibility of the nanoparticle aggregation, all types of photopatterned images gradually self-erased as the aggregates reverted to free NPs. When the films were left on the benchtop and exposed to ambient laboratory light, the erasure times were hours to several days depending on χ; in the dark, the images remained stable for over a week. When, however, the films were exposed to intense visible light or heated, erasure took only a few to tens of seconds. Once erased, the films could be rewritten multiple times. It was verified that the quality of these images did not deteriorate with the number of write/erase cycles for at least several hundred cycles. All photopatterned films used in this example were flexible and the images remained intact upon mechanical bending or twisting.

Figure 4:
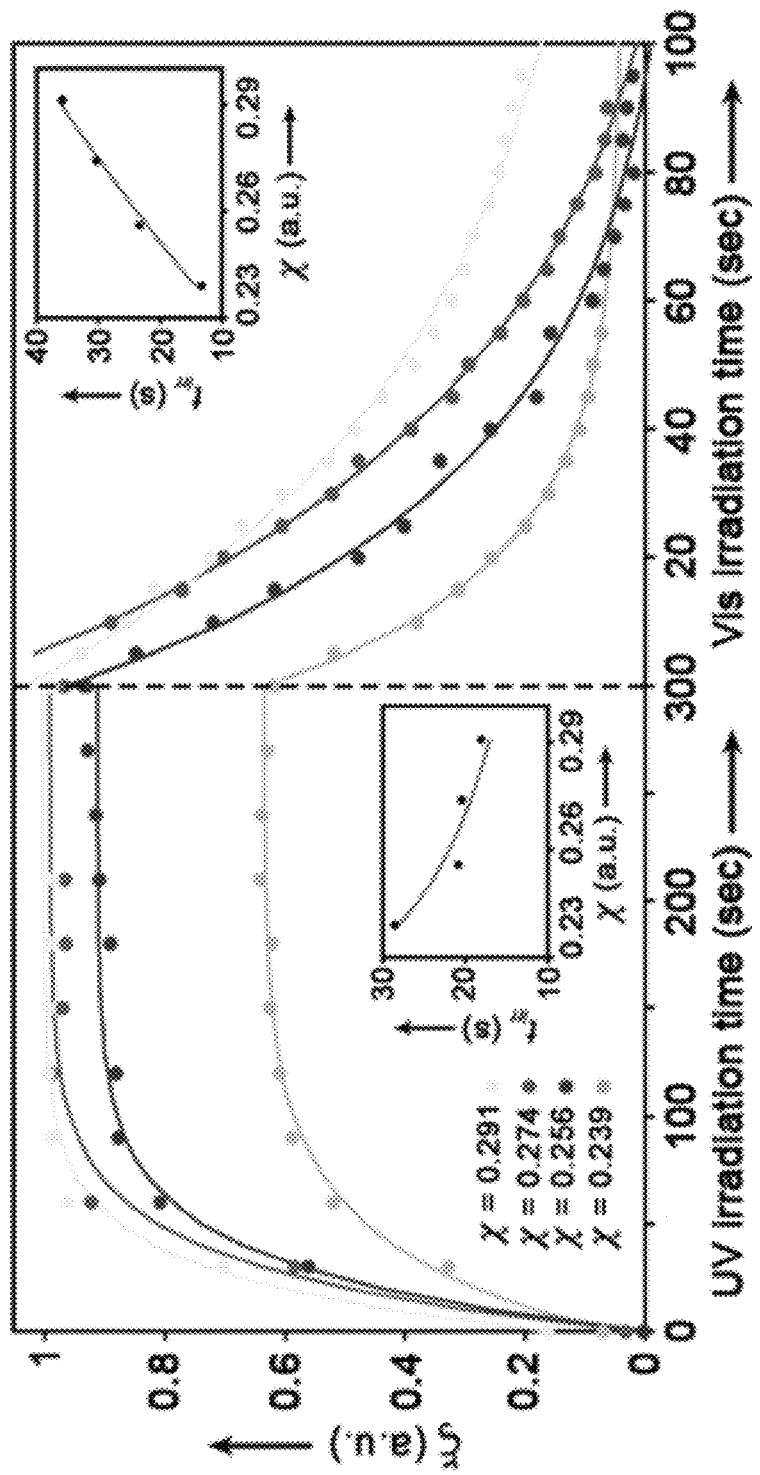
FIG. 4. shows the spectral changes upon irradiation with UV triggering radiation ($I_{UV}$=0.7 mW/cm$^2$, left) and erasure with Vis ($I_{Vis}$=0.8 mW/cm$^2$, right) for films differing in the surface concentrations, $\chi$, of azobenzene thiols coating AuNPs, as described in the Example. The values of $\chi$ are given in the legend. As in FIG. 3, the "progress" variable $\xi$ was calculated from the experimental extinction spectra and corresponds to the colormap on the right. The curves represent best exponential fits to the experimental data and were used to estimate the half times for writing and erasure (insets, left and right, respectively). Films characterized by low values of $\chi$ and weak dipole-dipole forces between the NPs take longer to write into, but they can be erased more rapidly. High-$\chi$ films in which dipole-dipole forces are stronger are more easily/rapidly patterned, but harder to erase.

The times required to write, $t_w$, and erase, $t_e$, high-contrast images depended on and could be controlled by the intensity of light (UV for writing, visible (Vis) for erasure) and by the fractional surface coverage, $\chi$, of the MUA ligands. Specifically, $t_w$ decreased with increasing $I_{UV}$ and varied between ~20 sec for $I_{UV}$=0.7 mW/cm² and ~0.8 s for $I_{UV}$=10 mW/cm². For a given value of $I_{UV}$, $t_w$ decreased with increasing $\chi$. On the other hand, the times required to erase the images decreased with increasing intensity of the visible light (e.g., $t_e$~24 hours in $I_{Vis}$=10 nW/cm² lighting vs. $t_e$~20 sec for $I_{Vis}$=0.8 mW/cm² halogen lamp) and with decreasing $\chi$, as shown in FIG. 4.

Without intending to be bound to any particular theory of the invention, the following possible explanations for these effects is suggested. It was first observed that the equilibrium solubility of NPs depends on the fractional surface coverage of the cis-MUA isomer, $\chi_{cis}$ ($0<\chi_{cis}<\chi$). (See Example Appendix B, below, for more details regarding nanoparticle solubility.) When $\chi_{cis}$ exceeds a critical value, $\chi_{cis}$*~0.23, the NP dispersion becomes unstable, and NPs aggregate until equilibrium is reestablished between the dispersed and the aggregated phases. The characteristic time of this process is controlled primarily by the trans-to-cis isomerization of the MUA ligands on the NP surfaces. Upon UV irradiation, $\chi_{cis}$ evolves in time as $\chi_{cis}=\chi_{cis}^{\infty}[1-\exp(-k_{tc}t)]$, where $k_{tc}$ is the first-order rate constant for cis-trans isomerization (this rate increases approximately linearly with the intensity of the incident UV light), and $\chi_{cis}^{\infty}$ is the cis-MUA coverage at the photostationary state (here, $\chi_{cis}^{\infty}\sim\chi$) corresponding to all MUA being in the cis form). Therefore, the characteristic writing time, $t_w$, is given by $\chi_{cis}(t_w)\sim\chi_{cis}$* or $t_w\sim k_{tc}^{-1}\ln[\chi/\chi-\chi_{cis}$*)]. For example, for intensity $I_{UV}$=0.7 mW/cm² corresponding to $k_{tc}$~0.1 s⁻¹, the writing time in a gel containing $\chi_{tc}$~0.33 NPs is estimated to be $t_w$~15 s; for more intense irradiation, $I_{UV}$=10 mW/cm² and $k_{tc}$~1 s⁻¹, the estimated writing time in the same gel decreases to $t_w$~1 s, in agreement with experiment. Note than since $k_{tc}\partial I_{UV}$, even faster writing should be possible with more intense irradiation.

The inventors believe that the erasure is not due to the diffusion of the aggregates, which would "smear" the images, but only due to their disassembly, which changes the color by weakening the electrodynamic coupling between proximal NPs. The diffusivities of single NPs and of the supraspheres in the homogeneous sPMMA organogel may be estimated as $D=D_0\exp(-\alpha R\phi^{0.75})$, where $D_0$=$kT/6\pi\mu R$ is the Stokes-Einstein diffusivity, kT is the thermal energy, $\mu$ is the solvent viscosity, R is the particle/aggregate radius, $\phi$~0.03 is the gel volume fraction, and $\alpha$~0.5 Å⁻¹ is a constant specific to a given solute/gel pair. Thus, for a single NP, $D_{NP}$~10⁻⁶ cm² s⁻¹; for an aggregate of radius ~50 nm, however, the diffusion coefficient drops dramatically to $D_{SS}$~10⁻¹⁵ cm² s⁻¹. Therefore, the characteristic times required for the aggregates to diffuse L~100 μm (typical size of the written features) are very long, on the order $L^2/D_{SS}$~10¹⁰ s. Instead, it is believed that erasure of the images is due entirely to NP disassembly, which is limited by the cis-to-trans isomerization rate and not by diffusion.

Although negligible for larger features, NP diffusion can play a critical role in the spatial resolution at microscopic scales. The smallest features that can be resolved in the films used in this experiment were on the order of ten microns. Within such small features (or near the edges of larger features), NPs diffuse into and out of the UV-irradiated regions on time scales commensurate with typical irradiation times ($t_w$~1-100 s). The diffusive mixing of irradiated and non-irradiated NPs results in an effective decrease of $\chi_{cis}$ on the particles located within the irradiated regions. Mathematically, this process can be described by considering the average cis-MUA coverage of the NPs, $\chi_{cis}^0$. This quantity evolves according to the following reaction-diffusion (RD) equation: $\partial\chi_{cis}^0/\partial t=D_{NP}\nabla^2\chi_{cis}^0+k_{tc}(\chi-\chi_{cis}^0)$, where $k_{tc}$~1 s⁻¹ within the irradiated regions (assuming 10 mW/cm² irradiation at 365 nm), and $k_{tc}$=0 otherwise (see Example Appendices B and C for further details). Appreciable color change occurs only when the condition $\chi_{cis}^0\sim\chi_{cis}$* is satisfied, and the interparticle interactions are sufficiently strong to induce NP aggregation. Importantly, the above equation is characterized by an intrinsic length scale $(D_{NP}/k_{tc})^{1/2}$~10 μm, over which the processes of reaction and diffusion are of similar importance. For large irradiated features, $L>>(D_{NP}/k_{tc})^{1/2}$, diffusion is negligible (except near the edges of the pattern), and the time required to resolve the image is controlled only by the isomerization rate. For small features, $L\leq(D_{NP}/k_{tc})^{1/2}$, diffusion opposes the increase of $\chi_{cis}^0$ within the feature, and increases the time required to resolve the image. For example, if the irradiated feature is an isolated, circular dot of radius L, the solution to the RD equation predicts that only circular features larger than ~16 μm can be resolved even with very long irradiation times, in agreement with experiment. The RD model also suggests that higher resolution and/or faster writing could best be achieved by increasing the initial concentration of NPs, or by increasing the power of UV irradiation.

Example Appendix A: Progress Variable for NP Assembly and Disassembly.

Figure 5:
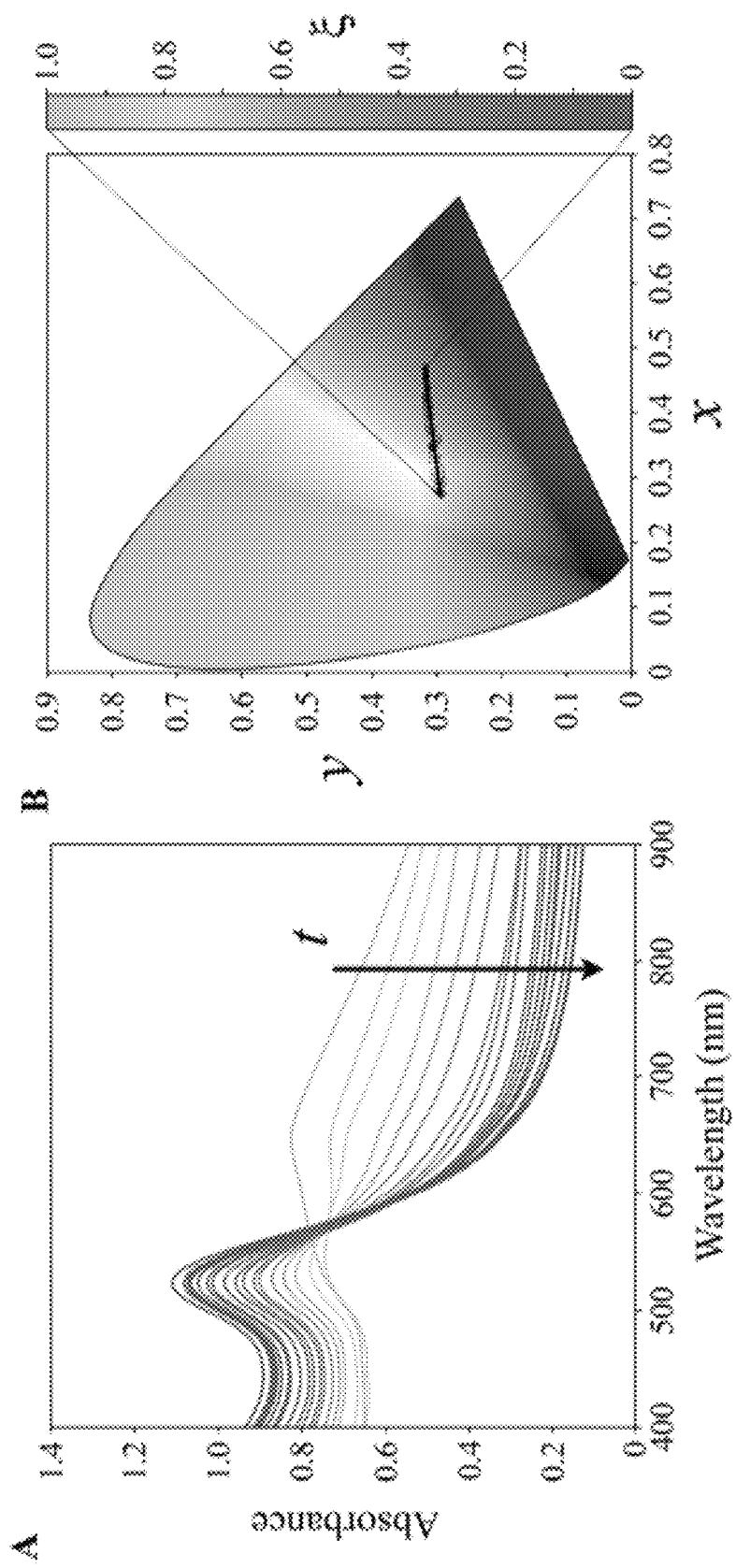
FIG. 5. shows: (a) UV-vis spectra of the disassembly of AuNP aggregates ($\chi$=0.291) under visible irradiation at 5 minute intervals. The top curve on the right hand side of the images corresponds to the UV-vis spectrum of the film immediately after stopping UV irradiation, time increases with the direction of the arrow. The shades of the curves correspond to a grayscale rendering of the perceived color of the film as calculated by the method described in Example Appendix A. (b) The CIE 1931 chromaticity diagram. The experimental spectra (plotted as open circles) fall on a single line (black) through the color space. This line is used to define the progress variable, $\xi$, shown on the right.
Figure 6:
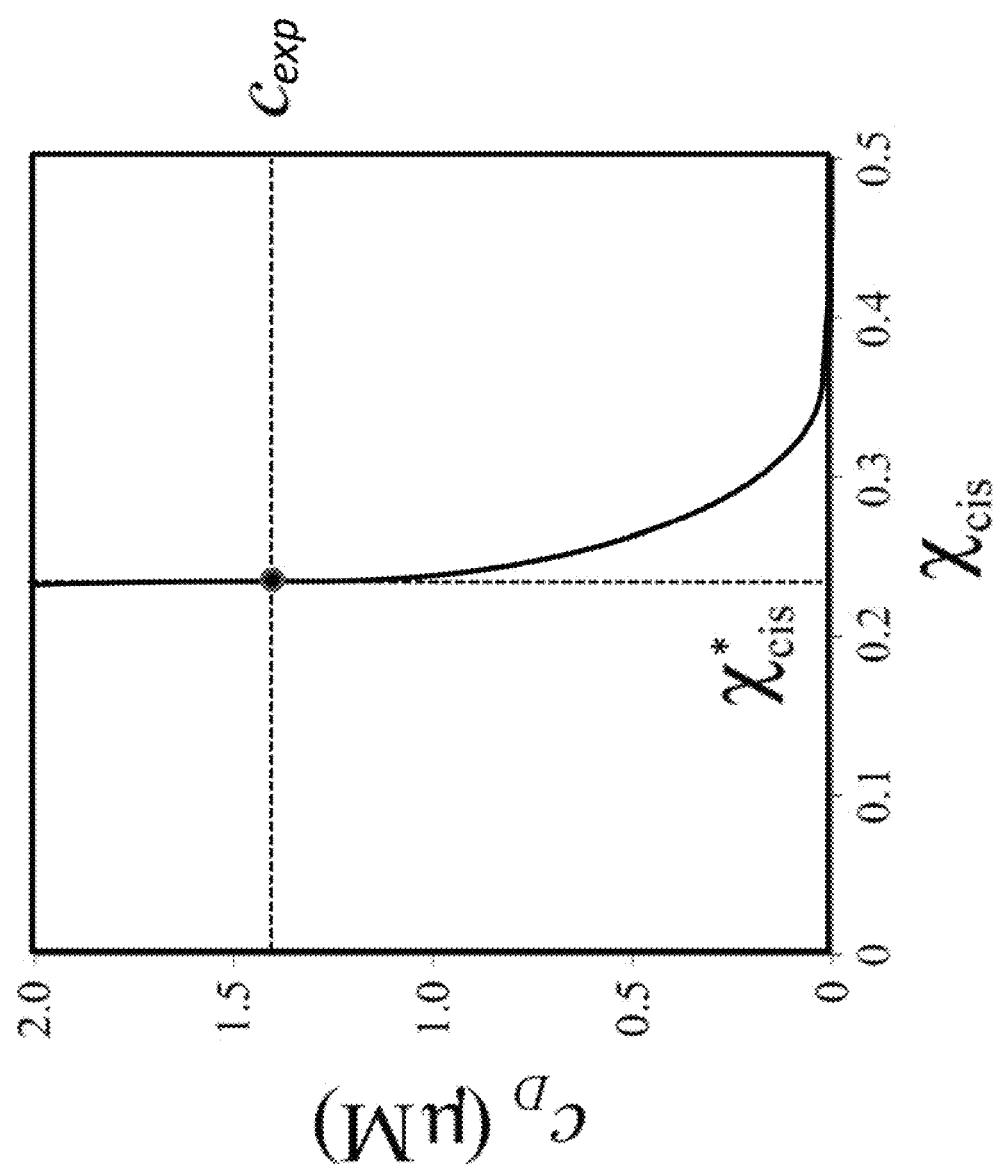
FIG. 6 shows the theoretical NP solubility curve described in Example Appendix B: concentration of dispersed NPs, $c_D$, as a function of the fractional cis-azobenzene coverage, $\chi_{cis}$. The experimental NP concentration (horizontal dashed line) intersects the solubility curve at $\chi^*_{cis}$~0.23, a critical cis-coverage required to induce NP aggregation.

The progress of NP assembly/disassembly within the polymer films during UV or visible irradiation was monitored quantitatively by measuring the UV-Vis extinction spectra at discrete time intervals, as shown in FIG. 5A. From these spectra, a progress variable, $\xi$, that provides a one-dimensional coordinate through the standard CIE 1931 color space is defined, as described in W. R. Wright, *The Measurement of Colour*, 4th Ed., Van Nostrand Reinhold, New York City 1969. Thus, each value $\xi$ of on the interval 0-1 corresponds to a color ranging from red to blue, respectively.

Specifically, the perceived XYZ color of a given sample was calculated from its experimentally measured transmittance, T($\lambda$), as follows:

$$X = \frac{1}{N}\int \bar{x}(\lambda)T(\lambda)I(\lambda)d\lambda \text{ with } N = \int \bar{y}(\lambda)I(\lambda)d\lambda$$

$$Y = \frac{1}{N}\int \bar{y}(\lambda)T(\lambda)I(\lambda)d\lambda$$

$$Z = \frac{1}{N}\int \bar{z}(\lambda)T(\lambda)I(\lambda)d\lambda$$

Here, $\bar{x}(\lambda)$, $\bar{y}(\lambda)$, and $\bar{z}(\lambda)$ are the CIE standard observer functions (1931 data for 2°), I($\lambda$) is the reference illuminant (here, chosen to be CIE Standard Illuminant D65), and the integration is carried out numerically over the wavelength interval, 360 nm$\leq\lambda\leq$830 nm. These quantities are normalized as x=X/(X+Y+Z), y=Y/(X+Y+Z), and z=1−x−y, such that the color of the transmitted light may be characterized by the coordinates (x,y) on the two-dimensional CIE chromaticity diagram (FIG. 5B).

Importantly, for all experimental measurements, the coordinates (x, y) fall onto a single line within the CIE color space (FIG. 5B), regardless of azobenzene coverage or the type of irradiation. Therefore, the progress of assembly/disassembly can be quantified by a single variable, ξ, measured along this line. Specifically, $$\xi \equiv \frac{(x-x_1)(x_2-x_1)+(y-y_1)(y_2-y_1)}{(x_2-x_1)^2+(y_2-y_1)^2},$$

where $(x_1, y_1)$ and $(x_2, y_2)$ are the bounding coordinates on the line (respectively, the most red and the most blue spectra measured experimentally). The fact that the experimental UV-Vis spectra fall onto a single linear trajectory in the CIE color space derives from the linear superposition of the absorbance due to free NPs (red) and aggregated NPs (blue), respectively. Thus, this behavior is quite general and applies equally well to silver NPs (but with a color "trajectory" ranging from yellow to purple).

Example Appendix B: Nanoparticle Solubility.

The reversibility of the aggregation/dissolution processes associated with writing suggests that the observed phenomena may be understood using thermodynamic (i.e., not kinetic) arguments. Thus, for a given surface composition (i.e., $\chi_{cis}$ and $\chi_{trans}$), free NPs are in equilibrium with those in the aggregate phase (if present). The equilibrium between the dissolved (D) and aggregated (A) phases is determined by the equivalence of the NP chemical potentials, $\mu_D=\mu_A$, which are assumed to obey the dilute-solution form, $\mu_i=\mu_i^o+kT \ln c_i$, where $\mu_i^o$ and $c_i$ are, respectively, the standard chemical potential and the concentration of NPs in phase i. Thus, the equilibrium NP solubility is approximated as $c_D=c_A \exp(\Delta\mu^o/kT)$ where $\Delta\mu^o=\mu_A^o-\mu_D^o$ is the decrease in free energy associated with NP aggregation.

In the present system, the dominant contributions to $\Delta\mu^o$ are dipole-dipole (DD) forces due to cis-azobenzenes on the NPs' surface. In the dispersed phase, these forces are small since the mean interparticle distance (~100 nm for the unaggregated, dilute solutions used here) is much larger than the relevant length scales for dipole-dipole interactions. Consequently, $\mu_D^o \approx 0$ and $\Delta\mu^o \approx \mu_A^o$. On the other hand, in the aggregated phase, the proximal NPs interact strongly, and the total interaction energy may be approximated by a pairwise summation over nearest neighbors only. In this way, $\Delta\mu^o$ can be approximated as $$\Delta\mu^0 = \frac{1}{2}nU_{DD}$$

where $U_{DD}$ is the dipole-dipole interaction energies for two NPs at contact, and n~10 is the average number of nearest neighbors in the aggregate phase (assuming random close-packing), as discussed in Bernal et al, *Nature* 1960, 88, 910-911.

The dipole-dipole energy between two NPs with a fractional coverage, $\chi_{cis}$, of cis-azobenzene may be approximated as $U_{DD} \approx A_{eff}\epsilon_{DD}\chi_{cis}/A_T$, where $A_{eff}=2\pi Ra$ is the "effective" area of contact between two spheres of radius R interacting via short-range forces (here, dipole-dipole) with a characteristic molecular scale a (here, a~5 Å, corresponding to closest dipole-dipole spacing), $\epsilon_{DD}=(-1/3kT)(\mu^2/4\pi\epsilon_0\epsilon a^3)^2$ is the single dipole-dipole energy (i.e., Keesom interaction for $\mu^2/4\pi\epsilon_0\epsilon a^3 \ll kT$), and $A_T=21.4$ Å is the area of thiol (or DDA) adsorption, as discussed in Sellers, et al., *J. Am. Chem. Soc.* 1993, 15 9389-9401. Here, with $\mu=2.7$ D and $\epsilon=2.379$, the single dipole-dipole energy is $\epsilon_{DD}$~0.12kT, and the dipole-dipole energy between two NPs is $U_{DD} \sim -(7.2 kT)\chi_{cis}$.

Example Appendix C: Reaction-diffusion of Suprasphere Nucleation.

Derivation of the Governing Equation.

Within the UV-irradiated regions, trans-MUA isomerizes to form cis-MUA at a rate, $r=k_{tc}\chi_{trans}$, where $\chi_{trans}=\chi-\chi_{cis}$, and $\chi$ is the fractional surface coverage of MUA (both cis and trans) on the NP surface. Thus, the concentration of NPs, $c(\chi_{cis},t)$, with fractional cis-MUA coverage, $\chi_{cis}$, evolves in time as:

$$\frac{\partial c(\chi_{cis}, t)}{\partial t} = -\frac{\partial}{\partial \chi_{cis}}\left[\frac{\partial \chi_{cis}}{\partial t}c(\chi_{cis}, t)\right] = -\frac{\partial}{\partial \chi_{cis}}[k_{tc}(\chi-\chi_{cis})c(\chi_{cis}, t)].$$

If these NPs are also free to diffuse, the above equation generalizes to:

$$\frac{\partial c(\bar{r}, \chi_{cis}, t)}{\partial t} = D_{NP}\nabla^2 c(\bar{r}, \chi_{cis}, t) - k_{tc}\frac{\partial}{\partial \chi_{cis}}[(\chi-\chi_{cis})c(\bar{r}, \chi_{cis}, t)].$$

Note that $k_{tc}>0$ only within the irradiated regions; otherwise, $k_{tc}=0$. Initially, the film has a uniform concentration, $c_o$, of NPs, all of which are covered with trans-MUA—i.e., $c(\bar{r},\chi_{cis},0)=c_o\delta(\chi_{cis})$, where $\delta(\ )$ is the Dirac delta function. Furthermore, within the irradiated regions, the condition $c(\bar{r},0,t)=0$ due to conservation of NPs. Importantly, these conditions result in the following equality, which may be derived by integrating the governing equation with respect to $\chi_{cis}$.

$$\int_0^{\chi_{cis}} c(\bar{r}, \chi_{cis}, t) d\chi_{cis} = c_0$$

Therefore, the quantity $\rho(\chi_{cis};\bar{r},t)=c(\bar{r},\chi_{cis},t)/c_o$ can be defined and interpreted as the probability density for finding an NP with cis coverage, $\chi_{cis}$, at a given location $\bar{r}$ and time t. Introducing other dimensionless variables, $\tilde{\chi}=\chi_{cis}/\chi$, $\tilde{t}=D_{NP}t/L^2$, $\tilde{r}=\bar{r}/L$, and $Da=k_{tc}L^2/D_{NP}$, where L is a characteristic length scale (e.g., the size of a feature), the governing equation becomes $$\frac{\partial \rho(\tilde{\chi};\tilde{r},\tilde{t})}{\partial \tilde{t}} = \tilde{\nabla}^2 \rho(\tilde{\chi};\tilde{r},\tilde{t}) - Da\frac{\partial}{\partial \tilde{\chi}}[(1-\tilde{\chi})\rho(\tilde{\chi};\tilde{r},\tilde{t})].$$

Because this partial differential equation may not be solved analytically, it is instructive to examine how the average coverage of cis-MUA, $\bar{\chi}$, varies with both space and time. Multiplying the above equation by $\tilde{\chi}$ and integrating with respect to $\tilde{\chi}$ over the interval [0,1], the following is obtained:

$$\frac{\partial \bar{\chi}}{\partial \tilde{t}} = \tilde{\nabla}^2 \bar{\chi} + Da(1-\bar{\chi}) \text{ where } \bar{\chi}(\tilde{r},\tilde{t}) \equiv \int_0^1 \tilde{\chi}\rho(\tilde{\chi};\tilde{r},\tilde{t})d\tilde{\chi}.$$

Linear Features.

The reaction-diffusion equation derived above describes the evolution of the average cis-MUA coverage, $\bar{\chi}$, and depends on both the isomerization reaction and NP diffusion. For example, consider the specific experimental geometry of a single line of UV irradiation with width 2 L as illustrated in FIG. 7A (left). Here, the governing equation becomes:

$$\frac{\partial \bar{\chi}}{\partial \tilde{t}} = \frac{\partial^2 \bar{\chi}}{\partial \tilde{y}^2} + Da(1-\bar{\chi}) \text{ with initial condition,}$$

$$\bar{\chi}(\tilde{y}, 0) = 0.$$

FIG. 7B (left) shows several solutions of the above equations obtained numerically; $\bar{\chi}(\tilde{y},\tilde{t})$ is a peaked function that grows in both height and width with increasing time. Here, the time evolution of the maximum, $\bar{\chi}(0,\tilde{t})$, which determines when the coverage of cis-MUAs will reach the critical value necessary for SS aggregation—i.e., $\bar{\chi}(0,\tilde{t})=\bar{\chi}^*$, where $\bar{\chi}^*=\chi^*_{cis}/\chi$ is the dimensionless aggregation threshold, is of particular interest. This function may be obtained analytically.

The problem is that of a continuous source of strength, $Da[1-\bar{\chi}(\tilde{y},\tilde{t})]$, located within the irradiated region, $-1 \leq \tilde{y} \leq 1$. The solution is given by:

$$\bar{\chi}(\tilde{y}, \tilde{t}) = \frac{Da}{2} \int_0^{\tilde{t}} (1-\bar{\chi})\left[\text{erf}\left(\frac{1-\tilde{y}}{2\sqrt{\tilde{t}-\tilde{t}'}}\right) + \text{erf}\left(\frac{1+\tilde{y}}{2\sqrt{\tilde{t}-\tilde{t}'}}\right)\right] d\tilde{t}'.$$

Differentiating this equation with respect to time and setting $\tilde{y}=0$, the following first order differential equation for the peak coverage, $\bar{\chi}_0(\tilde{t})=\bar{\chi}(0,\tilde{t})$ is obtained:

$$\frac{\partial \bar{\chi}_0}{\partial \tilde{t}} = Da[1-\bar{\chi}_0]\text{erf}\left(\frac{1}{2\sqrt{\tilde{t}}}\right) \text{ with initial condition,}$$

$$\bar{\chi}_0(0) = 0$$

This equation has the following solution.

$$\bar{\chi}_0(\tilde{t}) = 1 - \exp\left\{-Da\left[\sqrt{\frac{\tilde{t}}{\pi}}\exp\left(\frac{-1}{4\tilde{t}}\right) + \left(\tilde{t}+\frac{1}{2}\right)\text{erf}\left(\frac{1}{2\sqrt{\tilde{t}}}\right) - \frac{1}{2}\right]\right\}.$$

It will be useful to derive some approximate forms of the above solution in the limits of small and large times—i.e., for $\tilde{t} \ll 1$ and $\tilde{t} \gg 1$, respectively.

$$\bar{\chi}_0(\tilde{t}) \approx 1-\exp(-Da\tilde{t}) \text{ for } \tilde{t} \ll 1$$

$$\bar{\chi}_0(\tilde{t}) \approx 1-\exp(-2Da\sqrt{\tilde{t}/\pi}) \text{ for } \tilde{t} \gg 1$$

The exact solutions as well as these approximate forms are illustrated graphically in FIG. 7C (left).

In the experiments of this example, the UV irradiation time was typically within the range 1-100 s. Thus, for large features (here, $L > \sqrt{Dt_{exp}} \sim 10$ µm) the dimensionless experimental time scale is small, $\tilde{t}_{exp} < 1$, and the first approximation is appropriate. In dimensional quantities, $\bar{\chi}_{cis}(0,t) \sim \chi[1-\exp(-k_{tc}t)]$, and the average cis-MUA coverage is governed exclusively by the isomerization kinetics. For small features (here, $L < \sqrt{Dt_{exp}} \sim 10$ µm) the dimensionless experimental time scale is large, $\tilde{t}_{exp} > 1$, and the average coverage of cis-MUA at $y=0$ is approximated as $\bar{\chi}_{cis} \sim \chi\{1-\exp[-2k_{tc}L(t/\pi D_{NP})^{1/2}]\}$. In this limit, the geometry of the feature is also important.

Circular Feature.

To illustrate the effect of feature geometry, the case of an isolated irradiated circle of radius L is considered (See FIG. 7A (right)). This problem may be treated using a cylindrical coordinate system with the following governing equation.

$$\frac{\partial \bar{\chi}}{\partial \tilde{t}} = \frac{1}{\tilde{r}}\frac{\partial}{\partial \tilde{r}}\left(\tilde{r}\frac{\partial \bar{\chi}}{\partial \tilde{r}}\right) + Da(1-\bar{\chi}) \text{ with initial condition,}$$

$$\bar{\chi}(\tilde{r}, 0) = 0.$$

As before, the problem is that of a continuous source of strength, $Da[1-\bar{\chi}(\tilde{r},\tilde{t})]$, located within the irradiated region, $\tilde{r} \leq 1$. The peak concentration, $\bar{\chi}_0(\tilde{t})=\bar{\chi}(0,\tilde{t})$, is given by the following expression:

$$\bar{\chi}_0(\tilde{t}) = 1 - \exp\left\{-Da\left[\tilde{t}-\tilde{t}\exp\left(\frac{-1}{4\tilde{t}}\right) - \frac{1}{4}\int_{\frac{1}{4\tilde{t}}}^{\infty} \frac{\exp(-s)}{s} ds\right]\right\}.$$

Approximate forms of the above solution in the limits of small and large times are as follows:

$$\bar{\chi}_0(\tilde{t}) \approx 1-\exp(-Da\tilde{t}) \text{ for } \tilde{t} \ll 1$$

$$\bar{\chi}_0(\tilde{t}) \approx 1 - \exp\left(-\frac{1}{4}Da[1-\gamma+\ln(4\tilde{t})]\right) \text{ for } \tilde{t} \gg 1$$

Here, $\gamma \approx 0.577$ is the Euler gamma constant. Notice that for large features, $L > 10$ µm, the behavior is identical to that of the linear feature discussed above. For small features, however, the peak coverage in the circular feature increases much slower than that of the linear feature, as illustrated in FIG. 7C (right):

$$\bar{\chi}_{cis} \sim \chi\{1-\exp[-(k_{tc}L^2/4D)(1-\gamma+\ln(4D_{NP}t/L^2))]\}.$$

Summarizing, for large features, $L \gg \sqrt{Dt_{exp}}$, the peak cis-MUA coverage, $\bar{\chi}_{cis}(0,t)$, increases with time as $\bar{\chi}_{cis}(0,t) \sim \chi[1-\exp(-k_{tc}t)]$ and is independent of the feature geometry. In this regime, aggregation occurs (i.e., $\bar{\chi}_{cis}(0,t)=\chi^*_{cis}$) within time, $t^* \sim k_{tc}^{-1} \ln[\chi/(\chi-\chi^*_{cis})]$. For smaller features, $L \ll \sqrt{Dt_{exp}}$, diffusion influences the accumulation of cis-covered NPs, and the geometry of the feature is important. For linear features, the peak coverage of cis-MUA and the nucleation time are, respectively:

$$\bar{\chi}_{cis} \sim \chi\left[1-\exp\left(-2k_{tc}L\sqrt{\frac{1}{\pi D_{NP}}}\right)\right]$$

$$t^* \sim \frac{\pi D_{NP}}{4k_{tc}^2 L^2}\left[\ln\left(\frac{\chi}{\chi-\chi^*_{cis}}\right)\right]^2$$

For circular features and for $D_{NP}t/L^2 \gg 1$, the peak cis-MUA coverage and the time required to reach the aggregation threshold, $\bar{\chi}_{cis} \sim \chi^*_{cis}$ for can be approximated as, respectively:

$$\overline{\chi}_{cis} \sim \chi \left\{ 1 - \exp\left[ \frac{-k_{tc}L^2}{4D_{NP}} \left( 1 - \gamma + \ln\left( \frac{4D_{NP}t}{L^2} \right) \right) \right] \right\}$$

$$t^* \sim \frac{L^2}{4D_{NP}} \exp\left[ \gamma - 1 + \frac{4D_{NP}}{k_{tc}L^2} \ln\left( \frac{\chi}{\chi - \overline{\chi}_{cis}^*} \right) \right].$$

where $\gamma \approx 0.577$ is the Euler gamma constant. Thus, for typical values $\chi^*_{cis}/\chi \sim 0.7$, only circular features larger than ~16 μm can be resolved even with very long irradiation times, in agreement with experiment. This scaling analysis suggests that higher resolution and/or faster writing could best be achieved by increasing the initial concentration of NPs (thereby lowering $\chi^*_{cis}$), or by increasing the power of UV irradiation (and thereby $k_{tc}$).

As used herein, and unless otherwise specified, "a" or "an" means "one or more." All patents, applications, references, and publications cited herein are incorporated by reference in their entirety to the same extent as if they were individually incorporated by reference.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like includes the number recited and refers to ranges which can be subsequently broken down into subranges as discussed above. Finally, as will be understood by one skilled in the art, a range includes each individual member.

It is specifically intended that the present invention not be limited to the embodiments and illustrations contained herein, but include modified forms of those embodiments including portions of the embodiments and combinations of elements of different embodiments as come within the scope of the following claims.

We claim:

1. An ink comprising:
   a carrier film comprising an organogel; and
   a plurality of metal nanoparticles dispersed in the carrier film, each metal nanoparticle having a surface coating comprising photo-responsive ligands covalently bound to the metal nanoparticle, the photo-responsive ligands characterized in that they undergo a reversible transformation when exposed to triggering radiation, whereby the reversible transformation results in the reversible aggregation of the metal nanoparticles into non-crystalline assemblies resulting in a change in the color of the ink.

2. The ink of claim 1, wherein the organogel comprises poly(methyl methacrylate).

3. The ink of claim 1, wherein the transformation is a trans-cis isomerization and the triggering radiation is UV radiation.

4. An ink comprising:
   a carrier film comprising an organogel; and
   a plurality of metal nanoparticles dispersed in the carrier film, each metal nanoparticle having a surface coating comprising photo-responsive ligands covalently bound to the metal nanoparticle, the photo-responsive ligands characterized in that they undergo a reversible trans-cis isomerization when exposed to UV radiation, whereby the reversible trans-cis isomerization results in the reversible aggregation of the metal nanoparticles into non-crystalline assemblies resulting in a change in the color of the ink;
   wherein the ligands covalently bound to the metal nanoparticles are free of functional groups capable of covalently cross-linking the metal nanoparticles.

5. The ink of claim 4, wherein the surface coating comprises a self-assembled monolayer and the ligands comprise azobenzene-terminated thiols.

6. The ink of claim 5, wherein the self-assembled monolayer comprises a mixed monolayer of 4-(11-mercaptoundecanoxy)azobenzene and dodecylamine.

7. The ink of claim 6, wherein fractional surface coverage of the azobenzene-terminated thiols in the monolayer is about 0.2 to about 0.35.

8. The ink of claim 1, wherein the surface coating is free of surfactants.

9. The ink of claim 1, wherein the nanoparticles comprise gold, silver or an alloy thereof.

10. An ink comprising:
    a carrier film comprising an organogel; and
    a plurality of metal nanoparticles dispersed in the carrier film, each metal nanoparticle having a surface coating comprising photo-responsive ligands covalently bound to the metal nanoparticle, the photo-responsive ligands characterized in that they undergo a reversible transformation when exposed to triggering radiation, whereby the reversible transformation results in the reversible aggregation of the metal nanoparticles into non-crystalline assemblies resulting in a change in the color of the ink;
    wherein the concentration of metal nanoparticles in the carrier film is at least 30 mM.

11. A method of printing on a substrate coated with an ink, the ink comprising:
    a carrier film comprising an organogel; and
    a plurality of metal nanoparticles dispersed in the carrier film, each metal nanoparticle having a surface coating comprising photo-responsive ligands covalently bound to the metal nanoparticle, the photo-responsive ligands characterized in that they undergo a reversible transformation when exposed to triggering radiation, whereby the reversible transformation results in the reversible aggregation of the metal nanoparticles into non-crystalline assemblies resulting in a change in the color of the ink; the method comprising irradiating the ink with triggering radiation to form an image.

12. The method of claim 11, wherein the triggering radiation intensity, duration or both are varied over different regions of the ink, such that a multi-colored image is formed on the substrate.

13. The method of claim 11, further comprising discontinuing the irradiation and allowing the image to self-erase.

14. The method of claim 13, further comprising exposing the image to visible light or heat, whereby the time required for self-erasure is decreased.

15. The method of claim 14, wherein the image can be fully erased during a period of 60 seconds or less by exposing the image to visible radiation having an intensity of at least 0.3 mW/cm$^2$.

16. The method of claim 11, wherein the image includes colors across the spectrum from red to violet.

17. The method of claim 11, wherein the image can be formed during a period of irradiation lasting 10 seconds or less, using UV triggering radiation having an intensity of at least 10 mW/cm$^2$.

18. The method of claim 11, wherein the image has a resolution of 20 μm or better.

* * * * *